United States Patent
Thrasher

(10) Patent No.: US 10,834,927 B2
(45) Date of Patent: Nov. 17, 2020

(54) AQUEOUS EXTRACT OF ORANGE PEELS FOR SELECTIVELY KILLING FIRE ANTS

(71) Applicant: John Thrasher, Cullman, AL (US)

(72) Inventor: John Thrasher, Cullman, AL (US)

(*) Notice: Subject to any disclaimer, the term of this patent is extended or adjusted under 35 U.S.C. 154(b) by 67 days.

(21) Appl. No.: 16/233,196

(22) Filed: Dec. 27, 2018

(65) Prior Publication Data

US 2020/0205418 A1 Jul. 2, 2020

(51) Int. Cl.
*A01N 65/36* (2009.01)
*A01N 25/02* (2006.01)

(52) U.S. Cl.
CPC .......... *A01N 65/36* (2013.01); *A01N 25/02* (2013.01)

(58) Field of Classification Search
None
See application file for complete search history.

(56) References Cited

U.S. PATENT DOCUMENTS

| | | |
|---|---|---|
| 5,679,365 A | 10/1997 | Henderson et al. |
| 7,108,887 B2 | 9/2006 | Chu et al. |
| 7,201,928 B1 | 4/2007 | Huang et al. |
| 7,247,325 B2 | 7/2007 | Baik et al. |
| 7,807,190 B2 | 10/2010 | Kingsley |
| 8,084,052 B1 | 12/2011 | Mason et al. |
| 8,110,563 B1 | 2/2012 | Hutchins |
| 8,735,573 B2 | 5/2014 | Lang et al. |
| 8,796,326 B1 | 8/2014 | Hutchins |
| 8,926,867 B2 | 1/2015 | Gomes et al. |
| 2009/0148398 A1 | 6/2009 | Vander Meer et al. |
| 2017/0118998 A1* | 5/2017 | Bessette ............ A01N 31/04 |
| 2019/0307130 A1* | 10/2019 | Dale ............... A01N 63/10 |

FOREIGN PATENT DOCUMENTS

CN 105901028 A * 10/2016

OTHER PUBLICATIONS

Vogt J. et al. Efficacy of Three Citrus Oil Formulations Against Solenopsis invicta Buren. J of Agricultural and Urban Entomology 14(3)159-171, 2002. (Year: 2002).*

Drees B. et al. A New Technique for Laboratory Assessment of Red Imported Fire Ant Mound Drench Treatments. Southwestern Entomologist 27(2)177-183, Jun. 2002. (Year: 2002).*

Harish R et al. Antioxidant and Cytoprotective Action of Aqueous Extract of Citrus Sinensis Fruit Peel Against Endosulfan Induced Damage on S. cerevisiae. Int J of Pharma Research and Health Sciences 4(1)954-960 2016. (Year: 2016).*

* cited by examiner

*Primary Examiner* — Ralph J Gitomer
(74) *Attorney, Agent, or Firm* — Lanier Ford Shaver & Payne, PC; Gerald M. Walsh

(57) ABSTRACT

An aqueous extract produced by extracting orange peels with water, wherein orange peels are extracted in the amount of 0.5 to 1.5 cups of water per peel from a single orange, wherein the orange weighs 75 to 100 grams, and wherein the orange peels are extracted at 5 to 95° C. for 6 to 18 hours. The aqueous extract provides a method of killing fire ants by applying the aqueous extract to a fire ant mound in the amount of 0.5 to 1.5 cups of the aqueous extract per amount of fire ant mound that is 5 to 10 inches in diameter and 2 to 6 inches high. The aqueous extract is a safe natural product that is effective in killing fire ants selectively, is easy and inexpensive to manufacture, and can be broadcast safely over a wide area.

9 Claims, No Drawings

AQUEOUS EXTRACT OF ORANGE PEELS FOR SELECTIVELY KILLING FIRE ANTS

FIELD OF THE INVENTION

The present invention relates to insecticides for killing fire ants and, more particularly, to an aqueous extract of orange peels that kills fire ants when applied to a fire ant mound.

BACKGROUND OF THE INVENTION

Various species of ants pose significant problems for man from both an agricultural and a health care point of view. Fire ants are particularly destructive by stinging humans and livestock, feeding on germinating seeds and crop seedlings thereby reducing yields, damaging electrical equipment and damaging farm machinery that run into ant mounds. Requirements for an effective pesticide formulation for the control of pest social insect species, such as ants, are very stringent because the reproductive forms (queens) of social insects are buffered from the effects of insecticides by a large worker force and their often-closed nest structure. Thus, control of social insect pests is inherently different from control of non-social insects. For example, mature single queen fire ant colonies may contain up to 250,000-sterile workers and reach infestations rates of 130 mounds per hectare. Only 10 percent of the workers are on the surface foraging for food. Insecticide treatment with a fast-acting insecticide will not affect the 0.90% of the workers in the nest or the queen and the total effect is negligible. In fact, 95% of the workers can be killed, but if the queen is unaffected, the colony will come back.

In the last decades multiple queen fire ant colonies have proliferated. The number of mounds reach over 500 per hectare and because colonies of this social form are not territorial, the populations are composed of interconnected colonies that exchange workers, queens, and resources. Control of these fire ants is difficult because of the higher worker densities and more queens must be killed.

The fire ants, Solenopsis richteri and Solenopsis invicta, Red and Black imported fire ants, respectively, were inadvertently introduced into the United States in the early 1900's at the port of Mobile, Ala. From this early foothold, they spread throughout the southern states primarily via transport of queens or incipient colonies in nursery stock. In 1949, infestations were known to occur in 28 counties in Alabama, Florida and Mississippi. Four years later, after a survey of nurseries throughout the south, infestations had been detected in 102 counties in 10 states. Once established at these sites, the fire ants spread rapidly through their normal mating flights so that by 1983 about 230,000,000 acres were infested in 9 states. Currently there are over 130 million hectares infested in 14 Southern States from California to Virginia. To add to the complexity of the imported fire ant problem, multiple queen colonies have become becoming increasingly abundant throughout their range.

With the spread of fire ants came an increasing awareness that they cause numerous problems ranging from medically-related concerns associated with their stings and associated venom, to agronomic losses because of interference with farming operations, destruction of crops and injury or death of young animals. Imported fire ants have been estimated to cause around 5 billion dollars of annual expenditures associated with the damage they cause and the cost of their control. Because of the ant's huge economic impact, it is desirable to provide improved control of fire ant infestation.

The detection of incipient infestations is complicated by the fact that the ants either do not build mounds, or if they do, the ants build mounds that are very small. The workers do not fly, so survey traps based on flight are not feasible. The only practical approach appears to be finding infestations after mounds are built and killing the ants in the mounds. Because fire ants currently cannot be eradicated over wide areas, the goal has been to manage the ants with a combination of chemical and non-chemical control tactics in order to eliminate fire ants in areas where they pose the most immediate hazard to people, pets and livestock, and to reduce infestations to "acceptable" levels.

There are two basic approaches to chemical control of fire ants. An insecticide can be applied to individual mounds or it can be broadcast over a wide area infested with fire ant colonies. Individual mound treatments are usually more environmentally and ecologically acceptable because they use less insecticide and limit areas treated as compared to broadcast treatments, and they are likely to have less impact on nontarget insects. A most effective liquid treatment is done by drenching the mound. To be effective, the drench must trickle down through the mound and contact most of the fire ants in the colony. Ants contacted by the drench die in less than 24 hours. Drenches are the preferred treatment when the risk of human contact with fire ants is high and the fire ant infestation must be eliminated immediately because of the health risks of someone getting stung. The drench is applied at a rate of approximately 1 gallon per 6 inches of mound diameter. At this rate, for example, a mound measuring 12 inches across would receive 2 gallons of insecticide drench. The amount of drench applied is more important than the concentration of insecticide in the drench.

The drenching method requires relatively large volumes of water per mound. Consequently, the drenching method, at present, is not practical for use in wide broadcast application, such as from an airplane as is done with crop dusting. What is needed is an insecticide that is selective for killing fire ants, safe for use, and practical for wide broadcast application to drench fire ant mounds and kill fire ants.

SUMMARY OF THE INVENTION

The aqueous extract of the present invention is produced by extracting orange peels with water, wherein orange peels are extracted in the amount of 0.5 to 1.5 cups of water per peel from a single orange, wherein the orange weighs 75 to 100 grams, and wherein the orange peels are extracted at 5 to 95° C. for 6 to 18 hours. The aqueous extract is a clear solution having the property of killing ants selectively. The aqueous extract provides a method of killing fire ants by applying the aqueous extract to a fire ant mound in the amount of 0.5 to 1.5 cups of the aqueous extract per amount of fire ant mound that is 5 to 10 inches in diameter and 2 to 6 inches high.

An advantage of the present invention is an aqueous extract that is a safe natural product that is effective in killing fire ants.

Another advantage is an aqueous extract that is easy and inexpensive to manufacture;

Another advantage is an aqueous extract that is selective for killing fire ants.

Another advantage is only a small volume of the aqueous extract is needed to kill fire ants.

Another advantage is a safe aqueous extract of orange peels that can be broadcast over a wide area to kill fire ants.

DETAILED DESCRIPTION OF THE INVENTION

While the following description details the preferred embodiments of the present invention, it is to be understood that the invention is not limited in its application to the details of manufacture and method of use illustrated in the accompanying disclosure, since the invention is capable of other embodiments and of being practiced in various ways.

The aqueous extract of the present invention comprises an aqueous extract of orange peels. The peels are obtained from any common commercial orange fruit, including California, Valencia, Florida, Navel, and Mandarin oranges. The orange weighs, preferably, from 75 to 100 grams. The peel is removed from the orange by any suitable method. The peel is place in a container and water is added to the container in the amount of 0.5 to 1.5 cups (4 to 12 fluid ounces). The orange peel in the container is exposed to the water in the container for 6 to 18 hours at a temperature ranging from 5 to 95° C., preferably 24-29° C. The water (aqueous extract) is removed from the peel and is effective for killing fire ants. The aqueous extract is clear, has a detectable odor of an orange, and is stable at room temperature for at least 30 days.

The aqueous extract is used to kill fire ants by applying the aqueous extract to fire ant mounds. The aqueous extract is applied to a fire ant mound in the amount of 0.5 to 1.5 cups of aqueous extract per amount of a fire ant mound that is 5 to 10 inches in diameter and 2 to 6 inches high. The aqueous extract can be poured or sprayed onto the mound by any suitable means. A fire ant mound that is twice this diameter or twice as tall would get twice the amount of aqueous extract. By knowing the number of mounds to treat with the extract and the diameter and height of the mound, the total amount of extract to apply can be calculated. Because the amount of the aqueous extract needed to treat a mound is relatively small, the aqueous extract can be spayed over a large area of land by methods well known in the art. Assuming about 200 mounds on an acre of land, each mound 5 to 10 inches in diameter and 2 to 6 inches high, only 12 to 15 gallons of aqueous extract would be required to treat the mounds.

Five extracts were prepared as described above and tested on fire ant mounds about 5 to 10 inches in diameter and 2 to 6 inches high. Each of ten mounds were treated with one cup of aqueous extract by pouring the extract on the mound. In each case the fire ants were dead within 24 hours and the mound abandoned. It was further observed that other insects, such as non-target ants, were not killed by the aqueous extract. In this regard, the aqueous extract of the present invention is selective for killing fire ants.

It will be understood that various changes in the details and materials of the invention which have been described above in order to explain the nature of this invention may be made by those skilled in the art without departing from the principle and scope of the invention as recited in the following claims. For example, the aqueous extract can be scaled up to produce large quantities of the aqueous extract in one day, such as 100 gallons, from available orange peels. Other ingredients can be added to the extract as desired. Because of the inherent safety of the aqueous extract, it can be applied with any type of sprayer, including aerial spraying with airplanes or helicopters.

The invention claimed is:

1. A method of killing fire ants, comprising:
    1) providing an aqueous extract of orange peels; and
    2) applying the aqueous extract to a fire ant mound in sufficient volume to kill the fire ants within 24 hours.

2. The method of claim 1 wherein providing an aqueous extract of orange peels comprises placing the orange peels in water and extracting the orange peels with the water in the amount of 0.5 to 1.5 cups of water per peel from a single orange, said orange weighing 75 to 100 grams.

3. The method of claim 2, further comprising extracting the orange peels at 5 to 95° C. for 6 to 18 hours.

4. The method of claim 1, wherein the aqueous extract is a clear aqueous solution.

5. The method of claim 1, further comprising killing the fire ants selectively.

6. The method of claim 1, further comprising applying the aqueous extract to the fire ant mound in the amount of 0.5 to 1.5 cups of the aqueous extract per amount of fire ant mound that is 5 to 10 inches in diameter and 2 to 6 inches high.

7. A method of killing fire ants, comprising:
    1) providing an aqueous extract of orange peels by placing the orange peels in water and extracting the orange peels with the water, wherein orange peels are extracted in the amount of 0.5 to 1.5 cups of water per peel from a single orange, the orange weighing 75 to 100 grams, and wherein the orange peels are extracted at 5 to 95° C. for 6 to 18 hours; and
    2) applying the aqueous extract to a fire ant mound in sufficient volume to kill the fire ants within 24 hours, wherein the aqueous extract is applied to the fire ant mound in the amount of 0.5 to 1.5 cups of the aqueous extract per amount of fire ant mound that is 5 to 10 inches in diameter and 2 to 6 inches high.

8. The method of claim 7, wherein the aqueous extract is a clear aqueous solution.

9. The method of claim 8, further comprising killing the fire ants selectively.

* * * * *